United States Patent
Gollier et al.

(10) Patent No.: US 10,183,889 B2
(45) Date of Patent: *Jan. 22, 2019

(54) GLASS HAVING ANTIGLARE SURFACE WITH LOW DISPLAY SPARKLE

(71) Applicant: CORNING INCORPORATED, Corning, NY (US)

(72) Inventors: Jacques Gollier, Redmond, WA (US); Shandon Dee Hart, Corning, NY (US); Kelvin Nguyen, Wilmington, NC (US); Alan Thomas Stephens, II, Beaver Dams, NY (US); James Andrew West, Painted Post, NY (US); Lu Zhang, Taipei (TW)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,138

(22) Filed: Jun. 8, 2017

(65) Prior Publication Data

US 2017/0327418 A1    Nov. 16, 2017

Related U.S. Application Data (63) Continuation of application No. 13/405,787, filed on Feb. 27, 2012, now Pat. No. 9,701,579.
(Continued)

(51) Int. Cl.
*G02F 1/133*    (2006.01)
*C03C 21/00*    (2006.01)
(Continued)

(52) U.S. Cl.
CPC ............ *C03C 21/002* (2013.01); *C03C 15/00* (2013.01); *G02B 5/0215* (2013.01);
(Continued)

(58) Field of Classification Search
CPC .. G02B 5/02–5/0294; G02F 1/1335–1/133555
See application file for complete search history.

(56) References Cited

U.S. PATENT DOCUMENTS 2,381,479 A    8/1945    Adams et al.
3,616,098 A    10/1971    Falls
(Continued)

FOREIGN PATENT DOCUMENTS

CN    1469800    1/2004
JP    1993013021    1/1993
(Continued)

OTHER PUBLICATIONS

U.S. Appl. No. 61/447,285, filed Feb. 28, 2011, Gollier et al.
(Continued)

*Primary Examiner* — Bumsuk Won
*Assistant Examiner* — Jeffrey Madonna
(74) *Attorney, Agent, or Firm* — Kevin M. Johnson (57) ABSTRACT

A glass article having a low level of grainy appearance that can appear to have a shift in the pattern of the grains with changing viewing angle of a display, or "sparkle." The glass article—which, in some embodiments, is a transparent glass sheet—has small-angle-scattering properties and/or distinctness-of-reflected-image (DOI), leading to improved viewability in display applications, especially under high ambient lighting conditions. In some embodiments, the antiglare surface of the glass sheet is an etched surface, with no foreign coating present on the antiglare surface.

21 Claims, 3 Drawing Sheets

Related U.S. Application Data (60) Provisional application No. 61/447,242, filed on Feb. 28, 2011.

(51) Int. Cl.
  *G02F 1/1335* (2006.01)
  *G02B 5/02* (2006.01)
  *C03C 15/00* (2006.01)
  *G02F 1/1333* (2006.01)

(52) U.S. Cl.
  CPC ..... *G02B 5/0294* (2013.01); *G02F 1/133502* (2013.01); *C03C 2204/08* (2013.01); *G02F 2001/133331* (2013.01)

(56) References Cited

U.S. PATENT DOCUMENTS

| | | | |
|---|---|---|---|
| 4,921,626 A | 5/1990 | Rhodenbaugh | |
| 6,807,824 B1 | 10/2004 | Miwa | |
| 8,598,771 B2 | 12/2013 | Carlson et al. | |
| 8,771,532 B2 | 7/2014 | Carlson et al. | |
| 8,992,786 B2 | 3/2015 | Kohli et al. | |
| 9,017,566 B2 | 4/2015 | Lander et al. | |
| 9,085,484 B2 | 7/2015 | Guilfoyle et al. | |
| 2001/0035929 A1 | 11/2001 | Nakamura et al. | |
| 2004/0195201 A1 | 10/2004 | Chao et al. | |
| 2006/0204718 A1 | 9/2006 | Kawakami | |
| 2007/0217015 A1 | 9/2007 | Furuya et al. | |
| 2008/0142477 A1 | 6/2008 | Jacobs | |
| 2009/0041984 A1 | 2/2009 | Mayers et al. | |
| 2009/0071537 A1 | 3/2009 | Yavuzeetin et al. | |
| 2009/0142583 A1 | 6/2009 | Lin et al. | |
| 2010/0039708 A1 | 2/2010 | Suzuki et al. | |
| 2010/0246016 A1 | 9/2010 | Carlson et al. | |
| 2010/0279068 A1* | 11/2010 | Cook | C03B 23/26 428/141 |
| 2010/0321783 A1 | 12/2010 | Hirabayashi et al. | |
| 2011/0003121 A1 | 1/2011 | Tsuda | |
| 2011/0062849 A1 | 8/2011 | Carlson et al. | |
| 2012/0221264 A1 | 8/2012 | Gollier et al. | |

FOREIGN PATENT DOCUMENTS

| | | |
|---|---|---|
| JP | 09318929 A | 12/1997 |
| JP | 2009047915 A | 3/2009 |
| JP | 2009223154 | 10/2009 |
| WO | 2011137141 | 11/2011 |
| WO | 2012074811 | 6/2012 |

OTHER PUBLICATIONS

U.S. Appl. No. 61/329,936, filed Apr. 30, 2010, Guilfoyle, et al.
U.S. Appl. No. 61/372,655, filed Aug. 11, 2010, Guilfoyle, et al.
U.S. Appl. No. 61/329,951, filed Apr. 30, 2010, Kohli, et al.
U.S. Appl. No. 61/417,674, filed Nov. 29, 2010, Lander, et al.
"Quantifying sparkle of anti-glare surfaces" by Huckaby and Cairns, Paper 36.2, Proceedings of the Society for Information Display—Display Week 2009, San Antonio, Texas.
International Search Report and Written Opinion of the International Searching Authority; PCT/US2012/023563; dated May 2, 2012; 12 Pages.
JP2013556633 Office Action dated Feb. 23, 2016.
Lin et al; "Fast Nano-Scale Texturing Using the Self-Assembly Polymer Mask and Wet Chemical Etching"; Conference Record of the IEEE Photovoltaic Specialists Conference, 2009 pp. 1-5.
The Measurement of Appearance, by Richard Hunter (John Wiley & Sons, 1975).
TW101104925 Search Report dated Oct. 8, 2015.
EP12703221.7 Office Action dated Oct. 11, 2016, European Patent Office.
Visual quality of high-contrast projection screens. Part I: Visibility of screen artifacts and noise, by Fiske et. al. (Journal of the SID, 15/6, 2007).
CN201280010627.4 Notice of First Office Action; dated May 6, 2015.
English Translation of JP2016183891 Office Action dated Aug. 7, 2018, Japan Patent Office, 4 Pgs.

* cited by examiner

GLASS HAVING ANTIGLARE SURFACE WITH LOW DISPLAY SPARKLE

CROSS-REFERENCE TO RELATED APPLICATIONS

This application is a continuation of U.S. application Ser. No. 13/405,787, filed on Feb. 27, 2012, which claims the benefit of priority under 35 U.S.C. § 119(e) of U.S. Provisional Application Ser. No. 61/447,242, filed on Feb. 28, 2011, the disclosures of which are incorporated herein by reference in their entireties.

BACKGROUND

In applications such as touch screens or display or viewing windows of electronic devices such as liquid crystal displays (LCDs), a glass sheet or substrate is sometimes provided with an antiglare surface, the antiglare properties of the surface are typically provided by a roughened surface, which scatters incident light and thereby reduces glare. The roughened surface is often provided by a polymer film that is applied to a surface of the glass sheet that forms the front of the display. Such antiglare surfaces are often used on the front surfaces of the screens and displays mentioned above to reduce the apparent visibility of external reflections from the display and improve readability of the display under different lighting conditions.

Display "sparkle" or "dazzle" is a phenomenon that can occur when antiglare or light scattering surfaces are incorporated into a display system. Sparkle is associated with a very fine grainy appearance that can appear to have a shift in the pattern of the grains with changing viewing angle of the display. This type of sparkle is observed when pixelated displays such as LCDs are viewed through an antiglare surface. Such sparkle is of a different type and origin from "sparkle" or "speckle" that has been observed and characterized in projection or laser systems.

SUMMARY

A glass article having a low level of sparkle is provided. The glass article—which, in some embodiments, is a transparent glass sheet—has small-angle-scattering properties and/or a low distinctness-of-reflected-image (DOI), leading to improved viewability in display applications, especially under high ambient lighting conditions. In some embodiments, the surface of the glass sheet is an etched surface, and no foreign coating material used to form the antiglare surface.

Accordingly, one aspect of the disclosure is to provide a transparent glass sheet having at least one antiglare surface. The antiglare surface has a first RMS roughness Rlong of up to about 300 nm measured in a range of lateral spatial periods (sometimes referred to as surface wavelength) from about 80 µm to about 640 µm, a second RMS surface roughness Rshort measured at lateral spatial periods of less than about 20 µm, and a third RMS roughness Rtotal, measured without surface wavelength filtering, in a range from about 60 nm up to about 600 nm, wherein the ratio (Rlong/Rshort) is less than about 3.9.

A second aspect of the disclosure is to provide a display system. The display assembly comprises: a pixelated display having a plurality of pixels and an imaging plane; and a transparent glass sheet having an antiglare surface. The transparent glass sheet is disposed in front of the pixelated display such that the antiglare surface is distal from the pixelated display and separated from the imaging plane by a predetermined distance. The transparent glass sheet has a pixel power deviation of less than about 7.5% and a distinctness of image of less than about 60.

A third aspect of the disclosure is to provide a method of making a transparent glass sheet having at least one antiglare surface. The method includes roughening at least one surface of the transparent glass sheet to form the at least one antiglare surface, wherein the at least one antiglare surface has a first RMS surface height roughness Rlong of up to about 300 nm measured in a range of lateral spatial periods from about 80 µm to about 640 µm, a second RMS surface roughness Rshort measured at lateral spatial periods of less than about 20 µm, and a third RMS roughness Rtotal measured without surface wavelength filtering, wherein the ratio (Rlong/Rshort) is less than about 3.9, and wherein Rtotal is in a range from about 60 nm up to about 600 nm.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," "an," and the corresponding definite article "the" mean "at least one" or "one or more," unless otherwise specified.

Figure 1A:
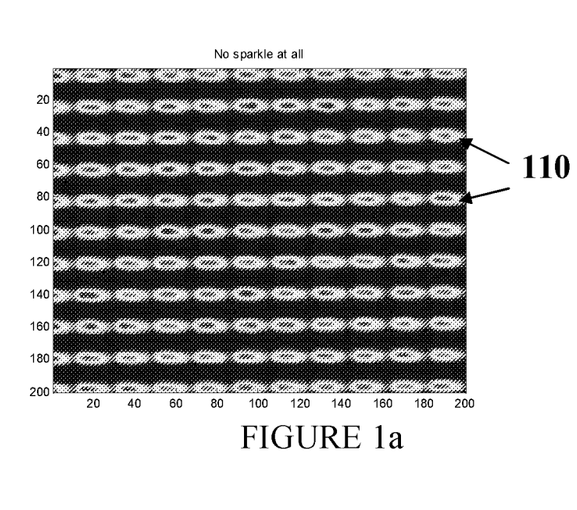
FIG. 1a is an image of a pixelated display combined with a first transparent glass sheet exhibiting no visible sparkle.
Figure 1B:
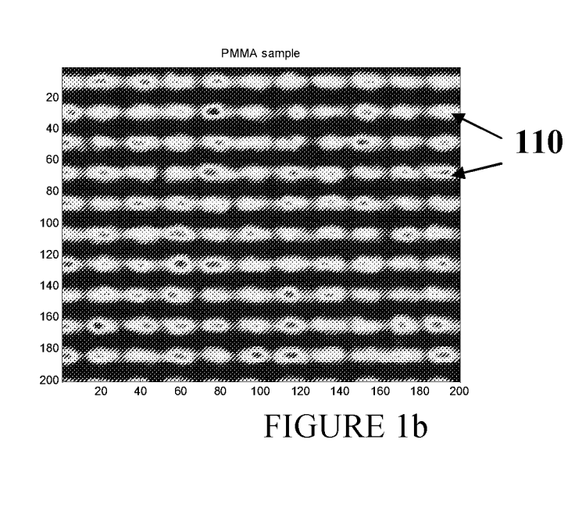
FIG. 1b is an image of a pixelated display combined with a second transparent glass sheet exhibiting noticeable sparkle.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Display "sparkle" or "dazzle" is a generally undesirable side effect that can occur when introducing antiglare or light scattering surfaces into a pixelated display system such as, for example, a liquid crystal display (LCD), an organic light emitting diode (OLED), touch screens, or the like, and differs in type and origin from the type of "sparkle" or "speckle" that has been observed and characterized in projection or laser systems. Sparkle is associated with a very fine grainy appearance of the display, and may appear to have a shift in the pattern of the grains with changing viewing angle of the display. Display sparkle may be manifested as bright and dark or colored spots at approximately the pixel-level size scale. Images of a first transparent glass sheet exhibiting no visible sparkle and a second transparent glass sheet exhibiting visible sparkle are shown in FIGS. 1a and 1b, respectively. The sample shown in FIG. 1a does not exhibit any visible sparkle, and has pixel images 110 that are regular and consistent with each other. In contrast, the image shown in FIG. 1b exhibits visible noise and some dispersion on the power per pixel. Consequently, the pixels 110 shown in FIG. 1b are more diffuse and appear to merge together.

Whereas the most common antiglare surfaces used in the display industry are coated polymer films, the present disclosure is primarily concerned with the optical and surface properties of a transparent glass article or sheet that is used as a protective cover glass over an LCD or other pixelated displays. In particular, a transparent glass sheet having a roughened surface and optical properties that minimize display "sparkle" and a display system comprising such a sheet are provided. Additionally, surfaces with preferred small-angle-scattering properties or distinctness-of-reflected-image (DOI) which lead to improved viewability in display applications, especially under high ambient lighting conditions, are provided. In some embodiments, the surface of the glass is an etched surface of the underlying glass. In some embodiments, the antiglare surface is formed without the application or other use of foreign coating materials (e.g., coatings, films, or the like).

The origin of display sparkle has previously not been well understood. There are many potential root causes that could be hypothesized, such as interference effects, Rayleigh or Mie-type scattering, and the like. As described herein, it has been determined that the type of display sparkle that is commonly observed in pixelated displays combined with antiglare surfaces is primarily a refractive effect in which features having some macroscopic (i.e., much larger than optical wavelength) dimension on the surface cause refraction or "lensing" of display pixels into varying angles, thus modifying the apparent relative intensity of the pixels, and a technique for quantifying this effect is provided herein. The technique measures the standard deviation of the total power collected from each display pixel using an 'eye simulator' camera system (i.e., a system that simulates the mechanics of the eye of a human observer). This metric correlates well to user judgments of display sparkle.

Figure 2A:
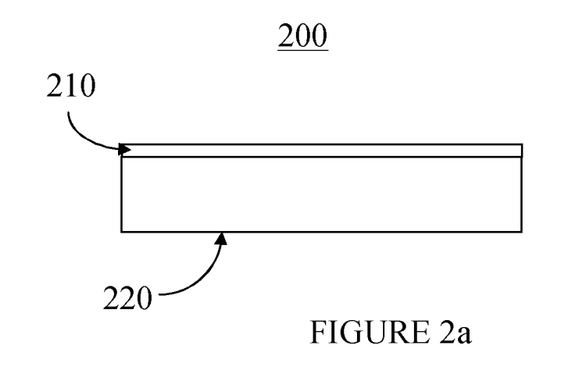
FIG. 2a is a schematic side view of a transparent glass sheet having an antiglare surface.
Figure 2B:
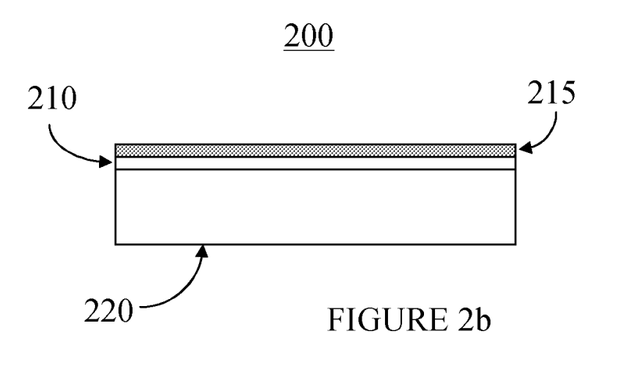
FIG. 2b is a schematic side view of a transparent glass sheet having an antireflective coating disposed over the antiglare surface of the transparent glass sheet.
Figure 3:
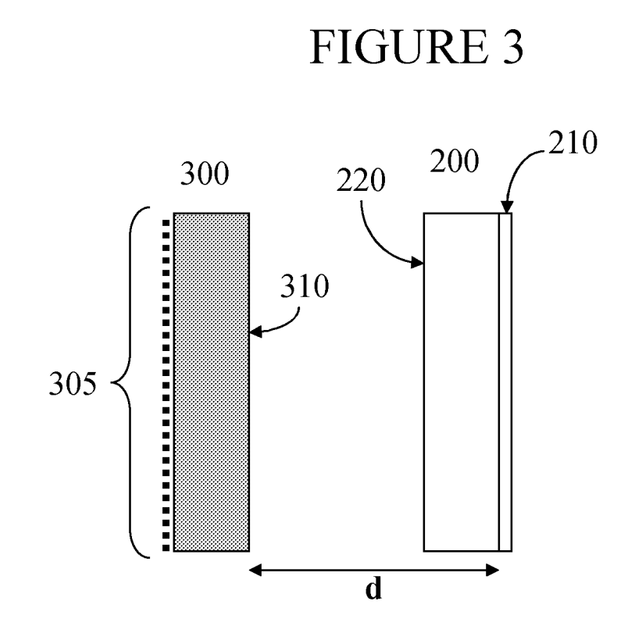
FIG. 3 is a schematic side view of a transparent glass sheet placed in front of a pixelated display.

Accordingly, in one aspect, a transparent glass sheet having at least one roughened antiglare surface that minimizes sparkle is provided. The antiglare surface is roughened using chemical etching and/or mechanical (e.g., grinding, polishing, etc.) processes or the like, and may be used as a protective cover glass over a pixelated display such as, for example, a liquid crystal display (LCD). A side view of a transparent glass sheet having an antiglare surface is shown in FIG. 2a. Transparent sheet 200 has a first, antiglare surface 210 and second surface 220 on the opposite side of transparent glass sheet 200. While the transparent glass sheet 200 shown in FIGS. 2a, 2b, and 3 is essentially a two dimensional, planar sheet, the transparent glass sheet may, in some embodiments, be a three dimensional sheet. In some embodiments, the roughened antiglare surface 210 is integral to the transparent glass sheet 200; i.e., the antiglare surface 210 comprises substantially the same material as the remainder or bulk of the transparent glass sheet 200 and is formed in situ on one surface of the glass sheet using those means described above (e.g., etching, grinding, polishing, etc.). In some embodiments, the antiglare surface 210 in its final form does not comprise any foreign (i.e., material that is different from the transparent glass sheet) material. In some embodiments, the second surface is optically smooth, having an RMS roughness of less than about 20 nm.

In some embodiments, the transparent glass sheet 200 further comprises an antireflective layer (215 in FIG. 2b) disposed over the antiglare surface 210. The antireflective layer 215 may, for example, be a coating or film applied by any of the various liquid or vapor deposition methods known in the art such as, but not limited to, spray, spin, or dip coating, physical vapor deposition (e.g., sputtering or evaporation), chemical vapor deposition, combinations thereof, or the like. Alternatively, the antireflective layer 215 may be applied to the antiglare surface as a free-standing film.

In some embodiments, the roughened antiglare surface 210 has a total RMS roughness (e.g., measured using a window size of about 0.6 mm×0.6 mm with no spatial frequency filtering) in a range from about 60 nm to about 600 nm and, in other embodiments, in a range from about 80 nm to about 300 nm. In some embodiments, second surface 220 is also roughened, having a total RMS roughness in the above ranges. In other embodiments, however, second surface 220 is a non-roughened surface, having a RMS roughness of less than about 20 nm.

As used herein, the term "Rlong" refers to the RMS surface roughness of long-wavelength lateral spatial features measured over a prescribed range (e.g., from about 40 µm to about 640 µm), unless otherwise specified. The term "Rshort" refers to the RMS surface roughness of short-wavelength lateral spatial features of less than about 20 µm, unless otherwise specified. The term "Rtotal" refers to the total RMS roughness measured for all lateral surface wavelengths (i.e., with no surface wavelength filtering) measured using a measurement window of a prescribed or predetermined size (e.g., about 0.6 mm×0.6 mm), unless otherwise specified.

Antiglare surfaces having reduced roughness amplitude or ratio ($R_{long}/R_{short}$) of long-wavelength spatial features relative to short-wavelength spatial features are also provided. In addition, antiglare surfaces having a total RMS roughness Rtotal in a desired range and an increased ratio (Rtotal/Rlong) of total RMS roughness Rtotal to RMS roughness of long-wavelength spatial features Rlong are provided. Such antiglare glass surfaces with combinations of low measured sparkle and low distinctness-of-reflected image were previously unobtainable with inorganic or glass antiglare surfaces. Whereas antiglare surfaces have been previously described in terms of total RMS roughness and average peak-to-peak feature spacing, the present disclosure provides relationships between surface wavelength ranges and roughness amplitude that are applicable to many different anti-glare surfaces, including even those that do not have an easily defined peak-to-peak feature spacing. These relationships are shown to quantitatively reduce display sparkle, thus leading to optimal surface configurations and surface parameters that have not been previously recognized.

The antiglare surface 210 has a first RMS surface height roughness (Rlong) of up to about 300 nm. Rlong is derived from the measurement of lateral surface spatial waves in the wavelength range between about 40 µm and about 640 µm, in some embodiments between about 60 µm and about 640 µm, and in some embodiments, between about 80 µm and about 640 µm. In some embodiments, Rlong is less than about 275 nm; in other embodiments less than about 250 nm; in still other embodiments, less than about 175 nm; in yet still other embodiments, less than about 140 nm; and in other embodiments, less than about 115 nm. In addition, the antiglare surface has a second RMS roughness (Rshort), which is derived from the measurement of surface spatial waves having lateral spatial periods of less than about 20 µm (e.g., from about 1 µm up to about 20 µm). In some embodiments, Rshort is at least about 30 nm; in other embodiments at least about 40 nm; in still other embodiments, at least about 45 nm; and in yet still other embodiments, at least about 50 nm.

The ratio of the first RMS roughness Rlong to the second RMS roughness Rshort (Rlong/Rshort) for the antiglare surface 210 of the transparent glass sheet 200 is less than about 4.9. In some embodiments the ratio Rlong/Rshort for the antiglare surface 210 is less than about 3.9 and, in other embodiment, less than about 2.9.

In some embodiments, the transparent glass sheet 200 described herein has a 20° distinctness of image (DOI) of less than about 85. In some embodiments, the DOI of the transparent glass sheet is less than about 80; in other embodiments, less than about 60; and, in other embodiments, less than about 40. As used herein, the term "distinctness of image" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, glass reflectance factor measurements are made on the at least one roughened surface of the glass sheet at the specular viewing angle and at an angle slightly off the specular viewing angle. The values obtained from these measurements are combined to provide a DOI value. In particular, DOI is calculated according to the equation $$DOI = \left[1 - \frac{Ros}{Rs}\right] \times 100, \quad (2)$$

where Ros is the relative reflection intensity average between 0.2° and 0.4 away from the specular reflection direction, and Rs is the relative reflection intensity average in the specular direction (between +0.05° and −0.05°, centered around the specular reflection direction). If the input light source angle is +20° from the sample surface normal (as it is throughout this disclosure), and the surface normal to the sample is taken as 0°, then the measurement of specular reflected light Rs is taken as an average in the range of about −19.95° to −20.05°, and Ros is taken as the average reflected intensity in the range of about −20.2° to −20.4° (or from −19.6° to −19.8°, or an average of both of these two ranges). As used herein, DOI values should be directly interpreted as specifying a target ratio of Ros/Rs as defined herein. In some embodiments, the transparent glass sheet glass sheet 200 has a reflected scattering profile such that >95% of the reflected optical power is contained within a cone of +/−10°, where the cone is centered around the specular reflection direction for any input angle.

In some embodiments, the transparent glass sheet described herein has a transmission haze value of less than about 40%. In some embodiments, the transmission haze of the transparent glass sheet is less than about 20%. As used herein, the terms "transmission haze" and "haze" refer to the percentage of transmitted light scattered outside an angular cone of about ±2.5° in accordance with ASTM procedure D1003. For an optically smooth surface, transmission haze is generally close to zero.

Representative embodiments of the transparent glass sheet 200 described herein, having various combinations of DOI, RMS roughness Rlong, ratio (Rlong/Rshort), RMS surface roughness Rshort, and/or total RMS roughness Rtotal are summarized in Table 1. It is to be understood that the disclosure and appended claims are not necessarily limited to those included in Table 1, and that the present disclosure encompasses embodiments in which transparent glass sheet may possess other combinations of the above parameters. In the embodiments described in Table 1, distinctness of image (DOI) is measured at 20°. In Embodiments A-G and Embodiment T, Rlong is the RMS roughness of the antiglare surface 210 measured using a measurement window size of about 2 mm×2 mm and in a lateral spatial wavelength range above about 80 µm (for example, from about 80 µm to about 640 µm). In Embodiments H-S, Rlong is the RMS roughness of the antiglare surface measured using a measurement window size of about 2 mm×2 mm and in a lateral spatial wavelength range above about 40 µm (for example, from about 40 to about 640 µm). For all embodiments listed in Table 1, Rshort is the RMS roughness of the antiglare surface measured using a measurement window size of about 0.15 mm×0.15 mm and in a lateral spatial wavelength range below 20 µm (for example, from about 1 µm to about 20 µm). For all embodiments listed in Table 1, Rtotal is the total RMS roughness measured for all lateral surface wavelengths (no surface wavelength filtering) measured using a measurement window size of about 0.6 mm×0.6 mm. It is necessary to specify the measurement window size in order to achieve repeatable results. The measurement window sizes selected in the embodiments listed in Table 1 represent a window size that accurately captures the relevant lateral surface waves used to measure RMS roughness in each particular surface wavelength range. Small deviations in measurement window size will not significantly modify the results listed in Table 1.

TABLE 1

Representative embodiments of the transparent glass sheet described herein.

| Embodiment | Transmission haze (%) | DOI (20°) | RMS roughness (nm) | | | Rlong/ Rshort | Rtotal/ Rlong[b] |
|---|---|---|---|---|---|---|---|
| | | | Rlong[d] | Rshort[e] | Rtotal[f] | | |
| A | | <60 | <115[b] | | | <3.9 | |
| B | | <60 | <250[b] | | | <2.9 | |

TABLE 1-continued

Representative embodiments of the transparent glass sheet described herein.

| Embodiment | Transmission haze (%) | DOI (20°) | RMS roughness (nm) Rlong[d] | Rshort[e] | Rtotal[f] | Rlong/ Rshort | Rtotal/ Rlong[b] |
|---|---|---|---|---|---|---|---|
| C |  |  | <250[b] | >45 |  | <3.9 |  |
| D |  |  | <250[b] | >30 |  | <2.9 |  |
| E |  | <85[a] | <200[b] | >50 |  |  |  |
| F |  |  | <140[b] | >45 |  |  |  |
| G |  | <85[a] | <115[b] | >30 |  |  |  |
| H |  | <60 | <175[c] |  |  | <4.9 |  |
| I |  | <60 | <300[c] |  |  | <3.9 |  |
| J |  |  | <300[c] | >45 |  | <4.9 |  |
| K |  |  | <300[c] | >30 |  | <3.9 |  |
| L |  | <85[a] | <275[c] | >50 |  |  |  |
| M |  | <85[a] | <220[c] | >45 |  |  |  |
| N |  | <85[a] | <175[c] | >30 |  |  |  |
| O | <40 | <60 | <300[c] |  |  | <3.9 |  |
| P | <10 | <60 | <300[c] |  |  | <3.9 |  |
| Q | <10[a] | <60 | <300[c] |  | 60-600 | <3.9 |  |
| R | <20 | <40 | <300[c] | >45 | 60-600 | <4.9 |  |
| S | <20 |  | <300[c] |  |  | <4.9 |  |
| T | <20[a] |  | <300[b] |  | 60-600 | <1.9 |  |
| U |  |  |  |  | 60-600 |  | ≥2.20 |
| V |  |  |  | >30 | 60-600 |  | ≥1.80 |
| W | <20 | <60 |  |  | 60-600 |  | ≥1.80 |

[a]Optional
[b]Rlong measured in a lateral spatial wavelength range above about 80 μm (e.g., from about 80 to about 640 μm)
[c]Rlong measured in a lateral spatial wavelength range above about 40 μm (e.g., from about 40 to about 640 μm)
[d]Rlong measured using a measurement window size of about 2 mm × 2 mm
[e]Rshort measured in a lateral spatial wavelength range below about 20 μm, using a measurement window size of about 0.15 mm × 0.15 mm
[f]Rtotal measured using a measurement window size of about 0.6 mm × 0.6 mm In one embodiment (Embodiment A in Table 1), the transparent glass sheet has at least one roughened antiglare surface and a DOI of less than about 60. The RMS roughness Rlong of the at least one roughened antiglare surface is less than about 115 nm, and the ratio Rlong/Rshort is less than about 3.9.

In another embodiment (Embodiment B in Table 1), the transparent glass sheet has at least one roughened antiglare surface and a DOI of less than about 60. The RMS roughness Rlong of the at least one roughened antiglare surface is less than about 250 nm, and the ratio Rlong/Rshort is less than about 2.9.

In another embodiment (Embodiment C in Table 1), the transparent glass sheet has at least one roughened antiglare surface. The RMS roughness Rlong of the at least one roughened antiglare surface is less than about 250 nm, Rshort is greater than about 45 nm, and the ratio Rlong/Rshort is less than about 3.9.

In another embodiment (Embodiment D in Table 1), the transparent glass sheet has at least one roughened antiglare surface. The RMS roughness Rlong of the at least one roughened antiglare surface is less than about 250 nm, Rshort is greater than about 30 nm, and the ratio Rlong/Rshort is less than about 2.9.

In another embodiment (Embodiment E in Table 1), the transparent glass sheet has at least one roughened antiglare surface. The RMS roughness Rlong of the at least one roughened antiglare surface is less than about 200 nm, and Rshort is greater than about 50 nm. The transparent glass sheet optionally has a DOI of less than about 85.

In another embodiment (Embodiment F in Table 1), the transparent glass sheet has at least one roughened antiglare surface. The RMS roughness Rlong of the at least one roughened antiglare surface is less than about 140 nm, and Rshort is greater than about 45 nm.

In another embodiment (Embodiment G in Table 1), the transparent glass sheet has at least one roughened antiglare surface. The RMS roughness Rlong of the at least one roughened antiglare surface is less than about 115 nm, and Rshort is greater than about 30 nm. The transparent glass sheet optionally has a DOI of less than about 85.

In another embodiment (Embodiment H in Table 1), the transparent glass sheet has at least one roughened antiglare surface and a DOI of less than about 60. The RMS roughness Rlong of the at least one roughened antiglare surface is less than about 175 nm, and the ratio Rlong/Rshort is less than about 4.9.

In another embodiment (Embodiment I in Table 1), the transparent glass sheet has at least one roughened antiglare surface and a DOI of less than about 60. The RMS roughness Rlong of the at least one roughened antiglare surface is less than about 300 nm, and the ratio Rlong/Rshort is less than about 4.9.

In another embodiment (Embodiment J in Table 1), the transparent glass sheet has at least one roughened antiglare surface. The RMS roughness Rlong of the at least one roughened antiglare surface is less than about 300 nm, Rshort is greater than about 45 nm, and the ratio Rlong/Rshort is less than about 4.9.

In another embodiment (Embodiment K in Table 1), the transparent glass sheet has at least one roughened antiglare surface. The RMS roughness Rlong of the at least one roughened antiglare surface is less than about 300 nm, Rshort is greater than about 30 nm, and the ratio Rlong/Rshort is less than about 3.9.

In another embodiment (Embodiment L in Table 1), the transparent glass sheet has at least one roughened antiglare surface. The RMS roughness Rlong of the at least one roughened antiglare surface is less than about 275 nm, and Rshort is greater than about 50 nm. The transparent glass sheet optionally has a DOI of less than about 85.

In another embodiment (Embodiment M in Table 1), the transparent glass sheet has at least one roughened antiglare surface. The RMS roughness Rlong of the at least one roughened antiglare surface is less than about 220 nm, and Rshort is greater than about 45 nm. The transparent glass sheet optionally has a DOI of less than about 85.

In another embodiment (Embodiment N in Table 1), the transparent glass sheet has at least one roughened antiglare surface. The RMS roughness Rlong of the at least one roughened antiglare surface is less than about 175 nm, and Rshort is greater than about 30 nm. The transparent glass sheet optionally has a DOI of less than about 85.

In another embodiment (Embodiment 0 in Table 1), the transparent glass sheet has at least one roughened antiglare surface. The RMS roughness Rlong of the at least one roughened antiglare surface is less than about 300 nm and the ratio Rlong/Rshort is less than about 3.9. The transparent glass sheet has a transmission haze of less than about 40% and a DOI of less than about 60.

In another embodiment (Embodiment P in Table 1), the transparent glass sheet has at least one roughened antiglare surface. The RMS roughness Rlong of the at least one roughened antiglare surface is less than about 300 nm and the ratio Rlong/Rshort is less than about 3.9. The transparent glass sheet has a transmission haze of less than about 10% and a DOI of less than about 60.

In another embodiment (Embodiment Q in Table 1), the transparent glass sheet has at least one roughened antiglare surface. The RMS roughness Rlong of the at least one roughened antiglare surface is less than about 300 nm, the RMS total roughness Rtotal is in a range from about 60 nm to about 600 nm, and the ratio Rlong/Rshort is less than about 3.9. The transparent glass sheet has a DOI of less than about 60 and, optionally, a transmission haze of less than about 10%.

In another embodiment (Embodiment R in Table 1), the transparent glass sheet has at least one roughened antiglare surface. The RMS roughness Rlong of the at least one roughened antiglare surface is less than about 300 nm, the RMS surface roughness Rshort is greater than about 45 nm, the RMS total roughness Rtotal is optionally in a range from about 60 nm to about 600 nm, and the ratio Rlong/Rshort is less than about 4.9. The transparent glass sheet has a DOI of less than about 40 and a transmission haze of less than about 20%.

In another embodiment (Embodiment S in Table 1), the transparent glass sheet has at least one roughened antiglare surface. The RMS roughness Rlong of the at least one roughened antiglare surface is less than about 300 nm and the ratio Rlong/Rshort is less than about 4.9. The transparent glass sheet has a transmission haze of less than about 20%.

In another embodiment (Embodiment T in Table 1), the transparent glass sheet has at least one roughened antiglare surface. The RMS roughness Rlong of the at least one roughened antiglare surface is less than about 300 nm, the RMS total roughness Rtotal is in a range from about 60 nm to about 600 nm, and the ratio Rlong/Rshort is less than about 1.9. The transparent glass sheet optionally has a transmission haze of less than about 20%.

In another embodiment (Embodiment U in Table 1), the transparent glass sheet has at least one roughened antiglare surface. The RMS total roughness Rtotal is in a range from about 60 nm to about 600 nm, and the ratio Rtotal/Rlong is greater than or equal to about 2.20.

In another embodiment (Embodiment V in Table 1), the transparent glass sheet has at least one roughened antiglare surface. The RMS surface roughness Rshort is greater than about 30 nm and the RMS total roughness Rtotal is in a range from about 60 nm to about 600 nm, and the ratio Rtotal/Rlong is greater than or equal to about 1.80.

In another embodiment (Embodiment W in Table 1), the transparent glass sheet has at least one roughened antiglare surface. The RMS total roughness Rtotal is in a range from about 60 nm to about 600 nm, and the ratio Rtotal/Rlong is greater than or equal to about 1.80. The transparent glass sheet has a DOI of less than about 60 and a transmission haze of less than about 20%.

In some embodiments, the transparent glass sheet comprises an ion exchangeable glass and is strengthened by either chemical or thermal means that are known in the art. In one embodiment, the transparent glass sheet is chemically strengthened by ion exchange. In this process, metal ions at or near a surface of the glass are exchanged for larger metal ions having the same valence as the metal ions in the glass. The exchange is generally carried out by contacting the glass with an ion exchange medium such as, for example, a molten salt bath that contains the larger metal ion. The metal ions are typically monovalent metal ions such as, for example, alkali metal ions. In one non-limiting example, chemical strengthening of a glass sheet containing sodium ions by ion exchange is accomplished by immersing the glass sheet in an ion exchange bath comprising a molten potassium salt such as potassium nitrate ($KNO_3$) or the like.

The replacement of small metal ions by larger metal ions in the ion exchange process creates in a region in the glass that extends from the surface to a depth (referred to as the "depth of layer") that is under compressive stress. This compressive stress at the surface of the transparent glass sheet is balanced by a tensile stress (also referred to as "central tension") within the interior of the glass sheet. In some embodiments, the surface of the transparent glass sheet described herein, when strengthened by ion exchange, has a compressive stress of at least 350 MPa, and the region under compressive stress extends to a depth of layer of at least 15 μm below the surface.

In some embodiments, the transparent glass sheet comprises a soda lime glass, an alkali aluminosilicate glass, or an alkali aluminoborosilicate glass. In one embodiment, the transparent glass sheet comprises an alkali aluminosilicate glass that comprises alumina, at least one alkali metal and, in some embodiments, greater than 50 mol %, $SiO_2$, in other embodiments, at least 58 mol %, and in still other embodiments, at least 60 mol % $SiO_2$, wherein the ratio $$\frac{Al_2O_3(\text{mol }\%) + B_2O_3(\text{mol }\%)}{\sum \text{alkali metal modifiers (mol }\%)} > 1,$$

where the modifiers are alkali metal oxides. This glass, in particular embodiments, comprises, consists essentially of, or consists of: about 58 mol % to about 72 mol % $SiO_2$; about 9 mol % to about 17 mol % $Al_2O_3$; about 2 mol % to about 12 mol % $B_2O_3$; about 8 mol % to about 16 mol % $Na_2O$; and 0 mol % to about 4 mol % $K_2O$, wherein the ratio $$\frac{Al_2O_3(\text{mol }\%) + B_2O_3(\text{mol }\%)}{\sum \text{alkali metal modifiers (mol }\%)} > 1,$$

where the modifiers are alkali metal oxides.

In another embodiment, the transparent glass sheet comprises an alkali aluminosilicate glass comprising, consisting essentially of, or consisting of: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $1K_2O$; 0 mol % to about 7 mol % MgO; and 0 mol % to about 3 mol % CaO.

In yet another embodiment, the transparent glass sheet comprises an alkali aluminosilicate glass comprising, consisting essentially of, or consisting of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $1K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %.

In still another embodiment, the transparent glass sheet comprises an alkali aluminosilicate glass comprising, consisting essentially of, or consisting: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about 5 mol % $K_2O$; about 4 mol % to about 6 mol % MgO; and 0 mol % to about 5 mol % CaO, wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)–$Al_2O_3$≤2 mol %; 2 mol %≤$Na_2O$–$Al_2O_3$≤6 mol %; and 4 mol %≤($Na_2O$+$K_2O$)–$Al_2O_3$≤10 mol %.

In other embodiments, the transparent glass sheet comprises $SiO_2$, $Al_2O_3$, $P_2O_5$, and at least one alkali metal oxide ($R_2O$), wherein 0.75≤[($P_2O_5$ (mol %)+$R_2O$ (mol %))/$M_2O_3$ (mol %)]≤1.2, where $M_2O_3$=$Al_2O_3$+$B_2O_3$. In some embodiments, [($P_2O_5$ (mol %)+$R_2O$ (mol %))/$M_2O_3$ (mol %)]=1 and, in some embodiments, the glass does not include $B_2O_3$ and $M_2O_3$=$Al_2O_3$. The glass comprises, in some embodiments: about 40 to about 70 mol % $SiO_2$; 0 to about 28 mol % $B_2O_3$; about 0 to about 28 mol % $Al_2O_3$; about 1 to about 14 mol % $P_2O_5$; and about 12 to about 16 mol % $R_2O$. In some embodiments, the glass comprises: about 40 to about 64 mol % $SiO_2$; 0 to about 8 mol % $B_2O_3$; about 16 to about 28 mol % $Al_2O_3$; about 2 to about 12 mol % $P_2O_5$; and about 12 to about 16 mol % $R_2O$. The glass may further comprise at least one alkaline earth metal oxide such as, but not limited to, MgO or CaO.

In some embodiments, the glass comprising the transparent glass sheet is free of lithium; i.e. the glass comprises less than 1 mol % $Li_2O$ and, in other embodiments, less that 0.1 mol % $Li_2O$ and, in other embodiments, o0 mol % $LI_2O$. In some embodiments, such glasses are free of at least one of arsenic, antimony, and barium; i.e. the glass comprises less than 1 mol % and, in other embodiments, less than 0.1 mol % of $As_2O_3$, $Sb_2O_3$, and/or BaO.

It has also been found that display system parameters such as pixel size and distance between the pixel image plane and the antiglare surface affect display sparkle. In particular, smaller display pixels generally result in sparkle that is visually and measurably more severe; it is therefore more challenging to keep sparkle low when incorporating an antiglare surface into a high-resolution (i.e., small pixel) display.

FIG. 3 is a schematic side view of a configuration of a pixelated (i.e., having a plurality of pixels) display and a transparent glass sheet 200, described herein, that may be used to determine the degree of sparkle of the antiglare surface 210 of transparent glass sheet 200. Transparent glass sheet 200 is disposed in front of a pixelated display 300 comprising a plurality of pixels 305 and having an image plane 310. In configurations such as that shown in FIG. 3, transparent glass sheet 200 is placed or configured in front of pixelated display 300 such that the antiglare surface 210 of the transparent glass sheet 200 is distal (i.e., facing away from) from the pixelated display 300 and is separated from the image plane 310 of the pixelated display 300 by a predetermined optical distance d.

When placed or configured in front of a pixelated display such as, for example, a LCD display or the like, the transparent glass sheet described herein has a pixel power deviation (PPD) of less than about 7.5% and, in some embodiments, less than about 7%. As used herein, the terms "pixel power deviation" and "PPD" refer to the quantitative measurement for display sparkle. Unless otherwise specified, PPD is measured using a display arrangement that includes an edge-lit LCD screen (twisted nematic LCD) having a native sub-pixel pitch of 60 μm×180 μm and a sub-pixel opening window size of about 44 μm× about 142 μm. The front surface of the LCD screen had a glossy, anti-reflection type linear polarizer film. To determine PPD of a display system or a transparent glass sheet that forms a portion of a display system, a screen is placed in the focal region of an "eye-simulator" camera, which approximates the parameters of the eye of a human observer. As such, the camera system includes an aperture (or "pupil aperture") that is inserted into the optical path to adjust the collection angle of light, and thus approximate the aperture of the pupil of the human eye. In the PPD measurements described herein, the iris diaphragm subtends an angle of 18 milliradians. The image of the LCD pixels as viewed through the iris is collected by a CCD (charge-coupled device) camera having at least about 20 CCD pixels per LCD pixel. PPD is calculated by analysis of the image collected by the CCD camera The measurement area typically comprises about 30×30 LCD pixels. In order to remove pixel power variations that come from different color filter transmission, only the green pixels of the display are illuminated. The LCD screen used in this measurement system has a PPD when measured alone (i.e., without the anti-glare glass sheet) of about 3.2-3.5%. The PPD values reported herein are calculated without any baseline or reference subtraction; i.e., the baseline PPD value of the LCD determined in the absence of a transparent glass sheet is included in the PPD values reported here.

PPD is calculated by image analysis of display pixels according to the following procedure. A grid box is drawn around each LCD pixel and the total power within each grid box is calculated from the CCD camera data and assigned as the total power for each pixel. The total power for each LCD pixel thus becomes an array of numbers, for which the mean and standard deviation may be calculated, and the PPD value is defined as the standard deviation of total power per pixel divided by the mean power per pixel (times 100). The total power collected from each LCD pixel by the eye simulator camera is measured and the standard deviation of total pixel power (PPD) is calculated across the measurement area, which typically comprises about 30×30 LCD pixels. In order to remove pixel power variations that come from different color filter transmission, only the green pixels of the display are illuminated. In this measurement system, the LCD screen used has a PPD when measured alone (without the anti-glare glass sheet) of about 3.2-3.5%.

The details of a measurement system and image processing calculation that are used to obtain PPD values are described in U.S. Provisional Patent Application No. 61/447,285, filed concurrently herewith on Feb. 28, 2011 by Jacques Gollier et al., and entitled "Apparatus and Method for Determining Sparkle," the contents of which are incorporated by reference herein in their entirety. The measurement system includes: a pixelated source comprising a plurality of pixels, wherein each of the plurality of pixels has referenced indices i and j; and an imaging system optically disposed along an optical path originating from the pixelated source. The imaging system comprises: an imaging device disposed along the optical path and having a pixelated sensitive area comprising a second plurality of pixels, wherein each of the second plurality of pixels are referenced with indices m and n; and a diaphragm disposed on the optical path between the pixelated source and the imaging device, wherein the diaphragm is has an adjustable collection angle for an image originating in the pixelated source. The image processing calculation includes: acquiring a pixelated image of the transparent sample, the pixelated image comprising a plurality of pixels; determining boundaries between adjacent pixels in the pixelated image; integrating within the boundaries to obtain an integrated energy for each source pixel in the pixelated image; and calculating a standard deviation of the integrated energy for each source pixel, wherein the standard deviation is the power per pixel dispersion.

In some embodiments, the transparent glass sheet 200 that is configured with the pixelated display 300 as shown in FIG. 3 has a 20° DOI of less than about 85; in some embodiments, less than about 80; and, in some embodiments, less than about 60 and, in other embodiments, less than about 40.

In some embodiments of the configuration described hereinabove, the pixelated display also exhibits a pixel power deviation (second pixel power deviation, or second PPD) when measured alone (i.e., without the transparent glass sheet is not disposed between the pixel display and the eye-simulator camera). In these instances, the PPD of the transparent glass sheet, when, in some embodiments, combined with the pixelated display, is no more that two times greater than the PPD of the pixelated display alone. In other embodiments, the PPD of the transparent glass sheet in no more than about 4% greater than the PPD of the pixelated display and, in some embodiments, no more than about 3.5% greater than the PPD of the pixelated display.

Representative embodiments of the transparent glass sheet described herein, having various combinations of DOI, PPD, and/or difference in the PPD of the transparent glass sheet when combined with the display from the PPD of the pixelated display alone (ΔPPD), are summarized in Table 2. It is to be understood that the disclosure and appended claims are not necessarily limited to those included in Table 2, and that the present disclosure encompasses embodiments in which transparent glass sheet may possess other combinations of the above parameters. In the embodiments described in Table 2, distinctness of image (DOI) is measured at 20°.

TABLE 2

Representative embodiments of the transparent glass sheet described herein.

| Embodiment | DOI (20°) | PPD (%) | ΔPPD |
|---|---|---|---|
| AA | <80 | <7 | |
| BB | <60 | <7.5 | |
| CC | <80 | | <3.5% |
| DD | <60 | | <4% |
| EE | <60 | | <4% |
| FF | <60 | | <2x |

In one embodiment, (Embodiment AA in Table 2), the transparent glass sheet has at least one roughened antiglare surface, wherein the DOI of the transparent glass sheet is less than about 80, and the PPD measured when the transparent glass sheet is placed or configured in front of a pixelated display as described hereinabove is less than about 7%.

In another embodiment, (Embodiment BB in Table 2), the transparent glass sheet has at least one roughened antiglare surface, wherein the DOI of the transparent glass sheet is less than about 20, and the PPD measured when the transparent glass sheet is placed or configured in front of a pixelated display as described hereinabove is less than about 7.5%.

In another embodiment, (Embodiment CC in Table 2), the transparent glass sheet has at least one roughened antiglare surface, wherein the DOI of the transparent glass sheet is less than about 80, and the PPD measured when the transparent glass sheet is placed or configured in front of a pixelated display as described hereinabove is no more than about 3.5% greater than the PPD of the pixelated display measured or otherwise determined without the transparent glass sheet placed/configured in front of the pixelated display.

In another embodiment, (Embodiment DD in Table 2), the transparent glass sheet has at least one roughened antiglare surface, wherein the DOI of the transparent glass sheet is less than about 60, and the PPD measured when the transparent glass sheet is placed or configured in front of a pixelated display as described hereinabove is no more than about 4% greater than the PPD of the pixelated display measured or otherwise determined without the transparent glass sheet placed/configured in front of the pixelated display.

In another embodiment, (Embodiment EE in Table 2), the transparent glass sheet has at least one roughened antiglare surface, wherein the DOI of the transparent glass sheet is less than about 60, and the PPD measured when the transparent glass sheet is placed or configured in front of a pixelated display as described hereinabove is no more than about 4% greater than the PPD of the pixelated display measured or otherwise determined without the transparent glass sheet placed/configured in front of the pixelated display. In addition, the smallest (minimum) sub-pixel window opening dimension in the pixelated display system is less than about 200 μm. In some embodiments, the smallest sub-pixel window opening dimension is less than about 100 μm and, in other embodiments, less than about 65 μm. The total distance between the imaging plane (for example, the color filter plane in an LCD display) of the pixelated display and the antiglare/scattering surface of the transparent glass sheet is in the range from about 1.0 mm to about 3.5 mm.

In another embodiment, (Embodiment FF in Table 2), the transparent glass sheet has at least one roughened antiglare surface, wherein the DOI of the transparent glass sheet is less than about 60, and the PPD measured when the transparent glass sheet is placed or configured in front of a pixelated display as described hereinabove is no more than two times greater than the PPD of the pixelated display as measured or otherwise determined without the glass sheet placed/configured in front of the pixelated display.

In another aspect, a display system comprising the transparent glass sheet having minimized sparkle, as described herein, is provided. The display system comprises a pixelated display (300 in FIG. 3) such as, for example, a LCD display, having a plurality of pixels (305 in FIG. 3) and an imaging plane (310 in FIG. 3), and a transparent glass sheet (200 in FIG. 3), such as those described hereinabove, having an antiglare surface (210 in FIG. 3). The transparent glass sheet is disposed in front of the pixelated display such that the antiglare surface is distal from the pixelated display and separated from the imaging plane by a predetermined distance, which, in some embodiments, is in a range from about 1.0 mm to about 3.5 mm. The transparent glass sheet described herein has a pixel power deviation (PPD) of less than about 7.5% and, in some embodiments, less than about 7%. In some embodiments, the transparent glass sheet has a distinctness of image (DOI) of less than about 80 and, in some embodiments, less than about 60. Various non-limiting embodiments of the transparent glass sheet of the display system are described hereinabove and summarized in Tables 1 and 2.

In some embodiments of the display system, the pixelated display also has a pixel power deviation when measured alone without the glass sheet having the antiglare surface (second pixel power deviation, or second PPD). Here, the PPD of the transparent glass sheet when combined with the display, in some embodiments, is no more that two times greater than the second PPD of the pixelated display. In other embodiments, the PPD of the transparent glass sheet in no more than about 4% greater than the second PPD of the pixelated display and, in some embodiments, no more than about 3.5% greater than the second PPD. The pixelated display may, in some embodiments, have a sub-pixel window opening dimension of less than about 200 µm. In some embodiments, the sub-pixel window opening dimension is less than about 100 µm and, in some embodiments, less than about 65 nm.

Glass samples having a single roughened antiglare surface were placed in front of the LCD screen with the roughened antiglare surface facing towards the camera. The samples were positioned with an air gap of 0.635 mm between the front surface of the LCD and the rear surface of the antiglare glass sample. Each antiglare glass sample had a thickness of 0.7 mm. Accounting for the thickness of the front LCD glass, the front LCD polarizer, the air gap, and the thickness of the antiglare sample, the total optical distance between the LCD image plane (color filter plane) and the rough antiglare surface was about 2.0 mm. The LCD screen was placed in a "green screen" mode, in which every green pixel was fully illuminated and all other pixels were turned off. Images of the pixels were captured using the eye simulator camera, and the standard deviation of total pixel power for each green pixel was calculated and reported as the PPD value.

DOI, Ros, Rs, and reflected scattering profiles were measured in reflection at 20° input angle (according to ASTM D5767) using a Novo-gloss IQ goniophotometer from Rhopoint instruments. In most cases, this instrument reported an automatically calculated DOI value that was not in precise agreement with the raw measured Ros and Rs values from the same instrument. In these instances, the raw Ros and Rs values were used to correct the automatic instrument calculation of DOI. These values are reported herein as "corrected" DOI values (i.e., based on raw Rs and Ros data). Unless otherwise specified, all DOI values reported throughout this disclosure are to be interpreted as "corrected" DOI values. Transmission haze was measured using a BYK-Gardner Haze-Gard Plus.

A surface profilometer such as, for example, a Zygo NewView optical surface profiler, which generates 2D surface profile maps, was used to study the optimal roughness parameters for generating low-sparkle antiglare surfaces. Surface spatial wavelength filtering techniques were used for the purposes of this analysis. This techniques involves analyzing the spatial wavelength content (also referred to as the power spectral density) of the surface roughness waves using Fourier transform techniques. In this way, "wavelength filters" can be applied and an effective RMS roughness value can be calculated using only surface spatial waves in a certain wavelength range. In actual practice, wavelength filters are frequently applied in roughness measurements to remove "noise" or "waviness" that is not part of the actual surface roughness profile. However, the typical wavelength filter used in this conventional way has a very broad wavelength window and does not provide information relevant to improving display sparkle. In order to accurately compare RMS roughness values across different instruments, it is necessary to specify the instrument, measurement window size, and wavelength filtering applied. Because more of the sample topology is included in the measurement, larger measurement windows will typically result in higher measured roughness values.

Long surface waves tend to increase sparkle, whereas short surface waves tend to decrease sparkle. Different potential surface wavelength ranges have been analyzed to identify those most likely to increase sparkle. As used herein, a statement such as "RMS roughness in a surface wavelength range of 1-20 microns (µm)" means that the RMS roughness has been calculated when filtering out all lateral spatial wavelengths outside the stated range while including the lateral spatial wavelengths inside the stated range to calculate RMS roughness in that range.

In order to adequately measure RMS roughness in widely different surface wavelength ranges, it was necessary to use different magnification levels in the optical surface profiler. Surface waves in the 1-20 µm lateral wavelength range were analyzed using a window size of approximately 0.1 mm×0.13 mm). Surface waves in the 40 µm-640 µm wavelength range were analyzed at about 50× magnification (using a window size of approximately 2.1 mm×2.3 mm). It was found that surface waves larger than 640 µm did not dramatically change the surface roughness. Thus, RMS roughness calculated in a 40 µm-640 µm lateral spatial wavelength window is practically identical to RMS roughness calculated for all surface waves larger than 40 µm. Similarly, RMS roughness calculated in a 1 µm-20 µm lateral spatial wavelength window was found to be practically identical to RMS roughness calculated for surface waves less than 20 µm. An intermediate window size (0.65 mm to 0.5 mm window) was chosen to calculate the total RMS roughness with no wavelength filter, in order to accurately capture both long and short surface waves. Specific embodiments that include various combinations of short-wave, long-wave, and total RMS roughness are described herein.

As described herein, the root cause of sparkle is correlated to the roughness parameters of the antiglare surface. In particular, reducing or minimizing the roughness amplitude of large (lateral spatial) wavelength features on the antiglare surface and/or increasing the roughness amplitude of small wavelength features is effective at reducing display sparkle. Glass etching processes may be used to obtain the desired surface roughness profiles and/or parameters such as lateral spacing or wavelengths of surface features. Processes for creating these types of surfaces on glass substrates are more difficult to optimize than, for example, polymer coating processes which have been historically optimized and made more deterministic through the use of molding or other direct patterning techniques that are suitable for polymers, but less suitable for glasses. In particular, glass etching processes—which do not leave a foreign coating material on the glass surface of the final article—have previously been unable to create antiglare surfaces with the type of well-controlled roughness parameters that are effective in minimizing display sparkle described herein.

The antiglare surfaces having the properties described herein may be obtained using a variety of etching processes. Non-limiting examples of such processes are described in U.S. patent application Ser. No. 12/858,544, filed on Aug. 18, 2010, by Krista L. Carlson et al., and entitled "Glass and Display Having Antiglare Properties;" U.S. patent application Ser. No. 12/730,502, filed on Sep. 30, 2010, by Krista L. Carlson et al., and entitled "Glass Having Antiglare Surface and Method of Making;" U.S. Provisional Patent Application No. 61/329,936, filed on Apr. 30, 2010, by Diane K. Guilfoyle et al., and entitled "Antiglare Treatment Method and Articles Thereof;" U.S. Provisional Patent Application No. 61/372,655, filed on Aug. 11, 2010, by Diane K. Guilfoyle et al., and entitled "Antiglare Treatment Method and Articles Thereof," and U.S. Provisional Patent Application No. 61/329,951, filed on Apr. 30, 2010, by Jeffrey T. Kohli et al., and entitled "Antiglare Surface and Method of Making," the contents of which are incorporated herein by reference in their entirety.

U.S. patent application Ser. No. 12/858,544 and Ser. No. 12/730,502 describe methods in which a glass surface is treated with a first etchant to form crystals on the surface. A region of the surface adjacent to each of the crystals is then etched to a desired roughness, followed by removing the crystals from the glass surface, and reducing the roughness of the surface of the glass sheet to provide the surface with a desired haze and gloss.

In one non-limiting example, the multistep treatment described in U.S. patent application Ser. No. 12/858,544 and Ser. No. 12/730,502 comprises a first roughening step in which the glass sheet is immersed in a first bath or otherwise contacts a solution, gel, or paste comprising 5-20 wt % ammonium bifluoride ($NH_4HF_2$), 0-5 wt % of a fluorinated or non-fluorinated alkali or alkaline earth salt (e.g., $NaHF_2$ or $CaCl_2$), and 10-40% of an organic solvent such as isopropyl alcohol or propylene glycol. These crystals are later removed by rinsing with water or by subsequent chemical treatment steps. An optional second step can include immersion or other treatment in a second solution comprising a non-fluorinated mineral acid such as sulfuric acid, hydrochloric acid, nitric acid, phosphoric acid, or the like. Alternatively, the second solution may be water only. This optional second step can serve to either partially or completely remove crystals from the glass surface. An optional third step (or second step, if the second step described above is omitted), can involve immersion or other treatment with an acidic solution containing 2-10 wt % hydrofluoric acid and 2-30 wt % of a mineral acid such as hydrochloric acid, sulfuric acid, nitric acid, phosphoric acid, or the like. This optional third step can also involve treatment with a basic solution instead of an acidic solution, such as a solution containing NaOH and EDTA.

U.S. Provisional Patent Application Nos. 61/329,936, 61/372,655, and 61/329,951 describe acidic and basic etch processes and the use of masks comprising polymer or wax coatings, particles, and combinations thereof to control the degree of etching of the glass surface. U.S. Provisional Patent Application Nos. 61/329,936 and 61/372,655 describe wet etch methods for generating an anti-glare surface in which particles are deposited on at least one surface of the glass. The at least one surface of the article having the deposited particles is brought into contact with an etchant (e.g., an etchant comprising HF and $H_2SO_4$) to form the anti-glare surface. The deposited particles may, for example, have a $D_{50}$ diameter of from about 0.1 µm to about 10 µm, from about 0.1 µm to about 50 µm, from about 1 µm to about 10 micrometers, or from about 1 µm to about 5 µm. The particles may be deposited, for example, on at the surface of the glass by forming a concentrated liquid suspension of the particles, diluting the concentrated suspension with a diluent, and contacting the surface with the diluted suspension. The deposited particles may, for example, comprise a glass, a composite, a ceramic, a plastic or resin based material, combinations thereof, or the like. In some embodiments, the etchant may comprise at least one acid suitable for etching the surface beneath the deposited particles. Non-limiting examples of such etchants are described in the references cited hereinabove (e.g., $HF/H_2SO_4$ etchants).

U.S. Provisional Patent Application No. 61/329,951 describes a method of making an article having an anti-glare surface, in which a protective film is formed on at least a portion of at least one surface of the article. The surface having the protective film is brought into contact with a liquid etchant to roughen the surface, and the protective film from the surface of the article to form the anti-glare surface. In some embodiments, the protective film may be a pore-forming polymer such as, for example, at least one of a sulfonamide formaldehyde resin, a nitrocellulose, a polymer or copolymer including an acrylate or acrylic monomer or salts thereof, a lacquer, an enamel, a wax, combinations thereof, or the like. In some embodiments, the protective film or pore-forming polymer may comprise any suitable coating material such as, for example, at least one polymer, or a combination of polymers, like natural or synthetic materials, or combinations thereof. Suitable pore-former compositions, which can provide durable yet removable porous coatings may include, but are not limited to, any polymer or polymer formulation, or like material or mixtures, having film-forming and pore-forming properties, such as TSO-3100 DOD ink (an ethanol isopropyl-based jettable ink from Diagraph), acetone-based o/p-toluene sulfonamide formaldehyde resins, a nitrocellulose, an acrylate polymer, an acrylate copolymer, a lacquer (a polymer dissolved in a volatile organic compound) formulation, an enamel, a wax, combinations thereof, or the like.

In some embodiments, the antiglare surfaces described herein may be formed by combining the teachings of the references cited and incorporated hereinabove. In particular embodiments, the antiglare surface may be formed by combining the deposition of particles on a surface of the transparent glass sheet, as described in U.S. Provisional Patent Application Nos. 61/329,936 and 61/372,655, and the deposition of a protective polymeric film, as described in U.S. Provisional Patent Application No. 61/329,951, and subsequently etching the surface to form one of the antiglare surfaces described hereinabove.

Such processes may be used to create the relationships between long-wave and short-wave roughness amplitudes that result in sparkle minimization as described herein. However, as the comparative examples illustrate, it is not straightforward to create the roughness profiles disclosed herein without detailed knowledge of the targets and measurements that are used to verify these targets.

With respect to mask and etch processes—non-limiting examples of which are described in U.S. patent application Ser. No. 12/858,544, and U.S. Provisional Patent Application Nos. 61/329,936, 61/372,655, and 61/329,951 referenced above—small mask openings, small mask features, and small spacing between mask features (particularly at the interface between the mask and the glass surface) are factors that facilitate minimization of long-wave roughness and promoting short-wave roughness as described herein. Furthermore, uniform mask thickness and medium-to-high levels of mask adhesion have been found to facilitate differential etching of the glass surface while maintaining short-wave lateral features and minimizing long-wave lateral features formed on the glass surface.

Table 3 summarizes the properties of examples of the antiglare surfaces described herein. Examples A-F comprise combinations of properties for both reducing the visibility of specular reflections and minimizing display sparkle that are exemplary of the embodiments described herein. Examples E and F are described in detail below. These samples were processed using techniques similar to some of those described so as to create the those roughness profiles that result in low sparkle as described hereinabove, in U.S. patent application Ser. No. 12/858,544 and Ser. No. 12/730,502; U.S. Provisional Patent Application Nos. 61/329,936, 61/372,655, and 61/329,951 referenced above; and U.S. Provisional Patent Application Nos. 61/417,674, filed on Nov. 29, 2010, by Charles Warren Lander et al., and entitled "Antiglare Surface Treatment Method and Articles Thereof," the contents of which are incorporated herein by reference in their entirety.

Whereas comparative examples A-I listed in Table 3 were prepared using techniques similar to some of those described in the above-referenced U.S. Patent Applications, the processes did not produce the roughness profiles that result in low sparkle. Comparative examples J and K were commercially available, and they do not comprise the combinations of antiglare and roughness properties that are described herein.

In addition to discovering the relevant surface property targets and corresponding measurements needed to demonstrate these targets, relevant process optimization parameters—in particular, relating to processes that include particle masking followed by etching—that enable these surfaces to be fabricated repeatably have also been determined. These process optimization parameters include mask particle size (generally less than about 20 µm), mask particle packing density at the glass surface (minimizing the occurrence of gaps between particles larger than 20 µm), mask thickness (5-100 µm), mask adhesion (must be sufficient to resist undercutting or removal of mask during initial acid contact), acid chemistry, and acid concentration (time allowed for glass etching to roughness depths greater than the desired levels must be shorter than the time for complete mask undercutting or removal). In addition, other optional parameters—such as mask drying and heating to promote adhesion—may be optimized so that the masking particles do not aggregate and lead to the formation of effectively larger particles or large gaps between particles at the mask surface.

Short wave RMS roughness was calculated using a wavelength filter that includes all surface waves between 1 µm and 20 µm, and excludes waves outside this range. Long wave RMS roughness was calculated in two different surface wavelength/filter (40 µm to 640 µm and 80 µm to 640 µm) ranges. The ratios between these two long-wave roughness values and the short-wave roughness values, as well as the ratio between total RMS roughness and long wave RMS roughness were also calculated. Measurement window sizes for the different roughness measurements are specified in Table 3.

TABLE 3

Properties of examples of the antiglare surface described herein and comparative examples.

| Antiglare glass sample | 1- or 2-side roughened | Transmission Haze | 20 degree DOI (corrected) | Total Pixel Power Std. Dev. (PPD) | Short wave RMS roughness (1-20 um filter, 0.13 × 0.1 mm window) | Long wave RMS roughness (40-640 um filter 2.1 × 2.3 mm window) | Long/short RMS ratio (40-640 RMS/ 1-20 RMS) | Long wave RMS roughness (80-640 um filter, 2.1 × 2.3 mm window) | Long/short RMS ratio (80-640 RMS/ 1-20 RMS) | Total RMS roughness (No filter, 0.65 × 0.5 mm window) | Total/Long RMS ratio (Total RMS/ 80-640 RMS) |
|---|---|---|---|---|---|---|---|---|---|---|---|
| Inventive example A | 1 | 1.9 | 53 | 7.3 | 36 | 137 | 3.8 | 80 | 2.2 | 160 | 2.00 |
| Inventive example B | 1 | 9.2 | 42 | 6.2 | 63 | 241 | 3.8 | 164 | 2.6 | 360 | 2.20 |
| Inventive example C | 1 | 15.0 | 0 | 7.0 | 92 | 207 | 2.3 | 102 | 1.1 | 510 | 5.00 |
| Inventive example D | 2 | 15.0 | 9 | 6.6 | 60 | 228 | 3.8 | 161 | 2.7 | 214 | 1.33 |
| Inventive example E (Ex. 1) | 1 | 7.0 | 6 | 6.6 | 115 | 198 | 1.7 | 118 | 1.0 | 312 | 2.64 |
| Inventive example E (Ex. 2) | 1 | 25.0 | 19 | 6.6 | 246 | 180 | 0.7 | 120 | 0.5 | 365 | 3.04 |

TABLE 3-continued

Properties of examples of the antiglare surface described herein and comparative examples.

| Antiglare glass sample | 1- or 2-side roughened | Transmission Haze | 20 degree DOI (corrected) | Total Pixel Power Std. Dev. (PPD) | Short wave RMS roughness (1-20 um filter, 0.13 × 0.1 mm window) | Long wave RMS roughness (40-640 um filter 2.1 × 2.3 mm window) | Long/short RMS ratio (40-640 RMS/ 1-20 RMS) | Long wave RMS roughness (80-640 um filter, 2.1 × 2.3 mm window) | Long/short RMS ratio (80-640 RMS/ 1-20 RMS) | Total RMS roughness (No filter, 0.65 × 0.5 mm window) | Total/Long RMS ratio (Total RMS/ 80-640 RMS) |
|---|---|---|---|---|---|---|---|---|---|---|---|
| Comparative example A | 1 | 2.6 | 9 | 9.2 | 44 | 238 | 5.4 | 150 | 3.4 | 258 | 1.72 |
| Comparative example B | 1 | 0.2 | 55 | 11.8 | 10 | 164 | 16.4 | 135 | 13.5 | 176 | 1.3 |
| Comparative example C | 1 | 0.5 | 50 | 10.0 | 21 | 197 | 9.4 | 146 | 7.0 | 181 | 1.24 |
| Comparative example D | 1 | 0.5 | 35 | 9.3 | 20 | 152 | 7.6 | 108 | 5.4 | 141 | 1.31 |
| Comparative example E | 1 | 3.7 | 31 | 13.9 | 45 | 292 | 6.5 | 218 | 4.8 | 315 | 1.44 |
| Comparative example F | 1 | 0.6 | 58 | 9.7 | 21 | 139 | 6.6 | 100 | 4.8 | 136 | 1.36 |
| Comparative example G | 1 | 2.2 | 38 | 12.1 | 33 | 205 | 6.2 | 152 | 4.6 | 204 | 1.34 |
| Comparative example H | 1 | 0.2 | 59 | 10.0 | 13 | 139 | 10.7 | 119 | 9.2 | 164 | 1.38 |
| Comparative example I | 1 | 0.3 | 55 | 8.4 | 14 | 123 | 8.8 | 94 | 6.7 | 125 | 1.33 |
| Comparative example J | 1 | 1.2 | 65 | 7.2 | 27 | 108 | 4.0 | 55 | 2.0 | 118 | 2.15 |
| Comparative example K | 1 | 2.0 | 46 | 8.0 | 40 | 182 | 4.6 | 121 | 3.0 | 199 | 1.64 |

In another aspect, a method of making a transparent glass sheet having at least one antiglare surface, such as those previously described herein, is provided. The method includes roughening at least one surface of the transparent glass sheet to form the at least one antiglare surface, wherein the at least one antiglare surface has a first RMS surface height roughness Rlong of up to about 300 nm, a second RMS surface roughness Rshort measured at spatial periods of lateral spatial periods of less than about 20 μm, and a third RMS surface roughness Rtotal measured without surface wavelength filtering, wherein the ratio (Rlong/Rshort) is less than about 3.9, and wherein Rtotal is in a range from about 60 nm up to about 600 nm.

First RMS surface height roughness Rlong is derived from the measurement of surface spatial waves in the wavelength range between about 40 μm and about 640 nm. In some embodiments, Rlong is less than about 275 nm; in other embodiments, less than about 250 nm; in still other embodiments, less than about 175 nm; in yet still other embodiments, less than about 140 nm; and in other embodiments, less than about 115 nm. Second RMS surface roughness Rshort is derived from the measurement of surface spatial waves having lateral spatial periods of less than about 20 nm. In some embodiments, Rshort is at least about 30 nm; in other embodiments at least about 40 nm; in still other embodiments, at least about 45 nm; and in yet still other embodiments, at least about 50 nm.

The ratio of the first roughness Rlong to the second Rshort (Rlong/Rshort) for the antiglare surface of the transparent glass sheet is less than about 4.9. In some embodiments the ratio Rlong/Rshort is less than about 3.9 and, in other embodiment, less than about 2.9.

In some embodiments, the method described herein further comprises strengthening the transparent glass sheet either before or after formation of the at least one antiglare surface. In some embodiments, the method comprises strengthening the transparent glass sheet by ion exchange, as previously described herein.

In some embodiments, roughening the at least one surface of the transparent glass sheet comprises etching the at least one surface. In some embodiments, a plurality of particles is deposited on the at least one surface prior to etching, as previously described hereinabove. The plurality of particles form a layer of particles on the surface. The etchant is applied to the layer of particles and migrates through the layer to the at least one surface to etch—and thus roughen—the surface. In other embodiments, a protective layer is applied to the at least one surface, as described hereinabove. Etchant is then applied to—and migrates through—the protective layer to roughen the surface. In other embodiments, a combination of the particles and protective layer are applied to the at least one surface, followed by application of the etchant.

EXAMPLES

The following examples describe various features and advantages provided by the disclosure, and are in no way intended to limit the invention and appended claims thereto. Examples 1 and 2 are illustrative examples of the fabrication of antiglare glass sheets according to the principles described in the present disclosure.

Example 1 (Inventive Example E in Table 3)

Sheets of glass having the nominal composition 69.49 mol % $SiO_2$; 8.45 mol % $Al_2O_3$; 14.01 mol % $Na_2O$; 1.16 mol % $K_2O$; 6.2 mol % MgO; 0.51 mol % CaO; 0.185 mol % $SnO_2$; 0.01 mol % $ZrO_2$; and 0.008 mol % $Fe_2O_3$ and dimensions of 6 inches×6 inches were first washed in an ultrasonic cleaner using about 4% semi-clean KG in deionized water.

A liquid suspension containing 33.33 wt % of Deurex ME 1515 low-molecular-weight polyethylene ("polyethylene wax") particles were weighed into a container and 66.64 wt % of 2-propanol was added. The container was processed for five minutes on a Resodyn™ Acoustic Mixer at the 60% level. Almost all particles in the suspension were in the range of 2 μm to 20 μm, with approximately 99% of the particles having a size below 19 μm in size and 50% of the particles having a size of below 6 μm. A small amount (1 ml) of this suspension was poured onto one side of a glass sample, and a 25 μm gap blade was swept across the surface of the glass, forming a thin film of the suspension with a wet thickness 25 μm was formed on the glass. To promote adhesion of the particles to the glass, the glass was placed on a hot plate with the coated side up and baked at 100° C. for 30 seconds.

Following the thermal treatment, the coated sample was then dipped into an acid etching solution containing 6 molar hydrofluoric/7 molar sulfuric acid at room temperature for 30 seconds. The etched sample was then removed for rinsing, which may include an optional organic solvent rinse, using acetone or other organic solvents known in the art, to remove mask residue. The etched glass was allowed to dry and was then optionally ion-exchanged in a molten $KNO_3$ bath at 410° C. for 6 hours, generating a surface compressive stress of greater than 350 MPa and an ion-exchange depth of layer greater than 15 μm in the glass sample.

The glass sample prepared as described in this example had a transmission haze of 7.0%, a 20° DOI (corrected) of 51, and a PPD (as specified hereinabove) of 6.6. RMS roughness values for this sample are listed in Table 3.

Example 2 (Inventive Example F in Table 3)

Glass samples having the same composition and dimensions were cleaned and coated with a dispersion of polyethylene was particles as described in Example 1. Following coating, the glass was placed on a hot plate with the coated side up and baked at 104° C. for 30 seconds. The coated sample was then dipped into an acid etching solution containing 6 molar hydrofluoric/7 molar sulfuric acid at room temperature for 20 seconds. The etched sample was then removed for rinsing, which may include an optional organic solvent rinse, using acetone or other organic solvents known in the art, to remove mask residue. The etched glass was allowed to dry and was then optionally ion-exchanged in a molten $KNO_3$ bath at 410° C. for 6 hours, generating a surface compressive stress of greater than 350 MPa and an ion-exchange depth of layer greater than 15 μm in the glass samples.

The glass sample prepared in this Example 2 had a transmission haze of 28%, a 20° DOI (corrected) of 19, and a PPD (measured as specified hereinabove) of 5.6. RMS roughness values for this sample are listed in Table 3.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A display system, the display system comprising:
a pixelated display having a plurality of pixels and an imaging plane; and
a transparent glass sheet having an etched glass antiglare surface, wherein the transparent glass sheet is disposed in front of the pixelated display such that the etched glass antiglare surface is distal from the pixelated display and separated from the imaging plane by an optical distance, wherein the transparent glass sheet has a pixel power deviation of less than about 7.5%, wherein the transparent glass sheet has a 20° distinctness of image of less than about 60.

2. The display system of claim 1, wherein the transparent glass sheet has a 20° distinctness of image of less than about 40.

3. The display system of claim 1, wherein the pixelated display alone has a second pixel power deviation, and wherein pixel power deviation of the transparent glass sheet combined with the pixelated display is less than about 4% greater than the second pixel power deviation.

4. The display system of claim 1, wherein the pixelated display alone has a second pixel power deviation, and wherein pixel power deviation of the transparent glass sheet combined with the pixelated display is less than about two times greater than the second pixel power deviation.

5. The display system of claim 4, wherein the pixelated display has a minimum sub-pixel window opening dimension of less than 200 μm.

6. The display system of claim 4, wherein the optical distance between the imaging plane and the etched glass antiglare surface is in a range from about 1.0 mm to about 3.5 mm.

7. The display system of claim 1, wherein the transparent glass sheet is strengthened.

8. The display system of claim 7, wherein the transparent glass sheet is strengthened by ion exchange, and wherein the transparent glass sheet has at least one surface having a region under a compressive stress, the region extending from the surface to a depth of layer within the transparent glass sheet.

9. The display system of claim 8, wherein the compressive stress is at least about 350 MPa and the depth of layer is at least 15 μm.

10. The display system of claim 1, wherein the transparent glass sheet comprises one of a soda lime glass, an alkali aluminosilicate glass, and an alkali aluminoborosilicate glass.

11. The display system of claim 10, wherein the glass comprises at least 2 mol % of $Al_2O_3$ or $ZrO_2$.

12. The display system of claim 1, wherein the transparent glass sheet has:
a first RMS surface roughness Rlong of up to about 300 nm measured in a range of lateral spatial periods from about 40 μm to about 640 μm; and
a second RMS surface roughness Rshort measured at lateral spatial periods of less than about 20 μm, wherein the ratio (Rlong/Rshort) is less than about 3.9.

13. The display system of claim 12, wherein the transparent glass sheet has an Rshort of at least about 30 nm.

14. The display system of claim 13, wherein the transparent glass sheet has a transmission haze of less than about 20%.

15. The display system of claim 12, wherein the transparent glass sheet has a third RMS roughness Rtotal, measured without surface wavelength filtering, in a range from about 60 nm to about 600 nm.

16. A glass article comprising:
   a transparent glass sheet having at least one etched glass antiglare surface, wherein the etched glass antiglare surface has:
   a first RMS surface roughness Rlong of up to about 300 nm measured in a range of lateral spatial periods from about 80 μm to about 640 μm; and a second RMS roughness Rtotal in a range from about 60 nm up to about 600 nm, measured without surface wavelength filtering, wherein there is a ratio Rtotal/Rlong of greater than or equal to about 2.20.

17. The glass article of claim 16, wherein the etched glass antiglare surface has a third RMS surface roughness Rshort of greater than about 30 nm, wherein Rshort is measured at lateral spatial periods of less than about 20 μm.

18. The glass article of claim 16, wherein the transparent glass sheet has a transmission haze of less than about 20%.

19. The glass article of claim 16, wherein the transparent glass sheet has a 20° distinctness of image of less than about 60.

20. The glass article of claim 16, wherein there is no foreign coating present on the etched glass antiglare surface.

21. The glass article of claim 16, wherein the etched glass antiglare surface has a third RMS surface roughness Rshort, wherein Rshort is measured at lateral spatial periods of less than about 20 μm, and Rlong/Rshort is less than about 3.9.

* * * * *

UNITED STATES PATENT AND TRADEMARK OFFICE
CERTIFICATE OF CORRECTION

PATENT NO. : 10,183,889 B2
APPLICATION NO. : 15/617138
DATED : January 22, 2019
INVENTOR(S) : Jacques Gollier et al.

It is certified that error appears in the above-identified patent and that said Letters Patent is hereby corrected as shown below:

In Column 26, Line 5, Claim 17, before "of greater" delete "nm".

Signed and Sealed this
Sixth Day of August, 2019

Andrei Iancu
*Director of the United States Patent and Trademark Office*